(12) United States Patent
Lyon et al.

(10) Patent No.: US 6,298,008 B1
(45) Date of Patent: Oct. 2, 2001

(54) PULSE-ECHO SYSTEM FOR MEDIUMS HAVING VARYING DENSITIES

(75) Inventors: Quinton Lyon, Peterborough; Steven J. Woodward, Port Hope, both of (CA)

(73) Assignee: Siemens Milltronics Process Instruments Inc., Peterborough (CA)

( * ) Notice: Subject to any disclaimer, the term of this patent is extended or adjusted under 35 U.S.C. 154(b) by 0 days.

(21) Appl. No.: 09/419,919

(22) Filed: Oct. 18, 1999

(30) Foreign Application Priority Data

Oct. 21, 1998 (GB) .................................................. 9823058

(51) Int. Cl.$^7$ ............................. G01S 15/08; G01S 15/00
(52) U.S. Cl. ......................... 367/99; 367/908; 73/290 V
(58) Field of Search ................................. 367/98, 99, 908; 73/290 V; 342/124

(56) References Cited

U.S. PATENT DOCUMENTS

| | | |
|---|---|---|
| 4,596,144 * | 6/1986 | Panton et al. ...................... 73/290 V |
| 4,831,565 | 5/1989 | Woodward . |
| 4,890,266 | 12/1989 | Woodward . |
| 4,992,998 | 2/1991 | Woodward . |
| 5,079,751 | 1/1992 | Woodward . |
| 5,150,334 * | 9/1992 | Crosby ................................. 367/908 |
| 5,323,361 * | 6/1994 | Elle et al. ............................. 367/908 |
| 6,062,070 * | 5/2000 | Maltby et al. ....................... 367/908 |
| 6,105,424 * | 8/2000 | Fay et al. ........................... 73/290 V |

* cited by examiner

Primary Examiner—Ian J. Lobo
(74) Attorney, Agent, or Firm—Ridout & Maybee

(57) ABSTRACT

A method of measuring the position of a target feature in a pulse-echo ranging system including transmitting at least one pulse of high frequency energy from a transducer towards the target feature, receiving energy reflected back from the direction of the target feature to the transducer to provide at least one return signal, repeatedly sampling the amplitude of the return signal(s) at intervals to form a digital database relating signal amplitude to elapsed time, and searching the database for at least one target zone in which a greater than background rate of fall of the return signal amplitude is sustained.

7 Claims, 1 Drawing Sheet

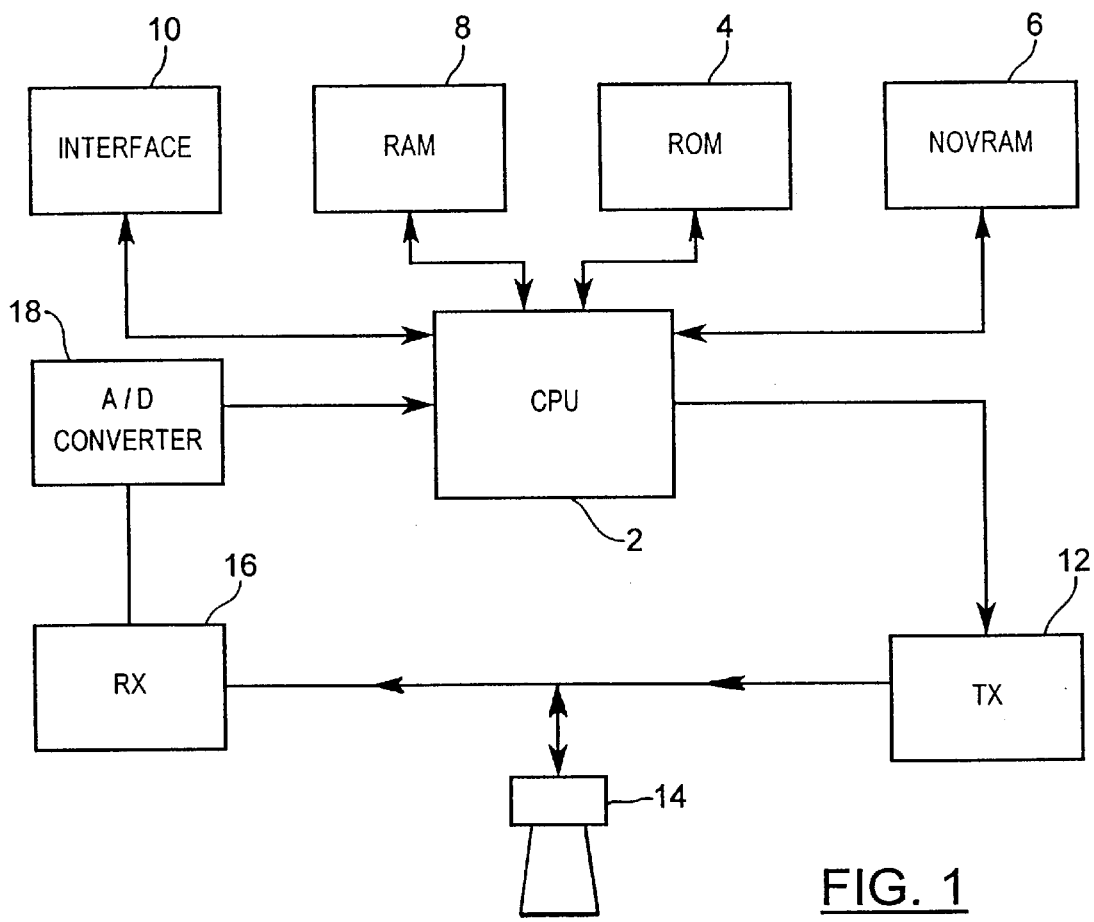
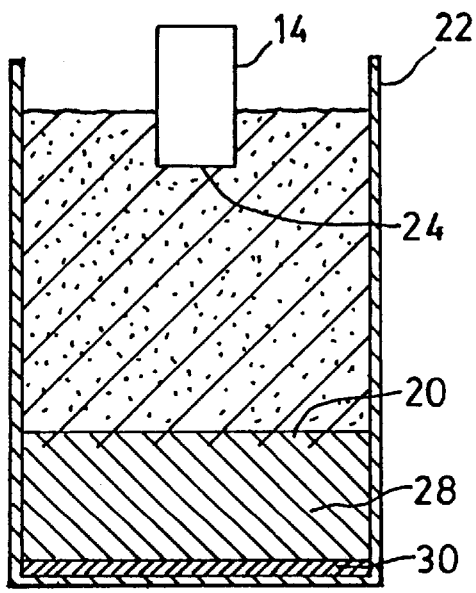
FIG. 2
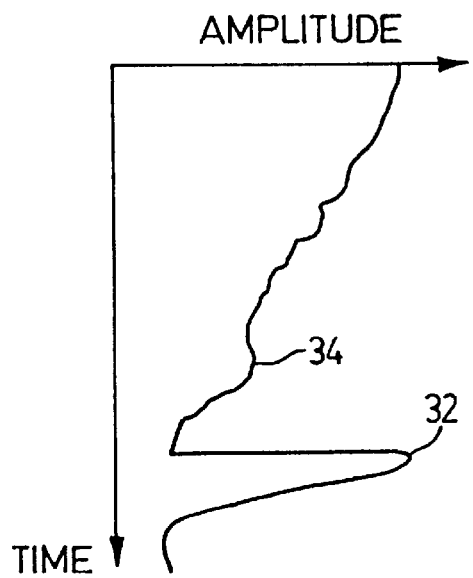
FIG. 3

PULSE-ECHO SYSTEM FOR MEDIUMS HAVING VARYING DENSITIES

FIELD OF THE INVENTION

This invention relates to pulse-echo measurement systems, in which a transducer directs a pulse of high frequency energy towards a target feature, and reflected energy contained in a return echo signal is analyzed in order to determine the location of the target feature.

BACKGROUND OF THE INVENTION

Commonly the target feature is a material interface whose level it is desired to monitor. The energy pulse may be of acoustic energy, or microwave electromagnetic energy. Since the wavelength of the energy utilized determines the resolution of the system, the wavelength needs to be very short compared to the distance between the transducer and the feature to be monitored.

U.S. Pat. Nos. 4,596,144; 4,831,565; 4,890,266; 4,992,998; and 5,076,751 describe methods of pulse echo measurement in which a profile of the return echo signal is digitized, stored in memory and the stored echo profile is analyzed to locate a wanted echo from the target feature. Typically such methods utilize some form of time varying threshold signal profile against which the stored echo profile is compared to enable both low amplitude distant echoes and higher amplitude closer echoes to be detected. In each case an echo due to reflection is characterized by a profile which exhibits a significant increase in amplitude relative to the threshold, providing a feature which projects significantly above the threshold curve.

In some applications, the target feature does not produce a return signal having these characteristics. For example, in sludge monitoring applications where the feature to be monitored is an interface between layers of liquid containing respectively a low concentration of suspended material and a substantially higher concentration, there may not always be a well marked echo from the interface itself, or the amplitude of the echo may be substantially attenuated in passing back through the upper layer. Instead, the interface may be characterized by a change in reflectivity from the supernatant layer, which the pulse penetrates, but in which particulate material or air bubbles reflect a certain amount of energy, and a relatively opaque layer from which relatively little energy returns towards the transducer. In such a case the interface will tend to be characterized by drop in echo amplitude beyond the interface rather than an upwardly projecting echo at the interface. In other cases also, the trailing edge of an echo will usually be characterized by an increased rate of decrease in amplitude of the return signal behind the projecting peak.

In sludge monitoring applications, as well as some other applications, the characteristic of the feature being monitored which is of most interest is not the distance of the feature from the transducer, but its distance from a bottom surface of a tank, vessel or channel. Such a bottom surface will normally provide a strong echo provided that the tank is empty, or overlying material is not too opaque to the pulse energy, and thus its position can readily be ascertained.

It should be understood that location of a target feature in pulse-echo ranging systems typically involves three functions; firstly the identification of features in the echo signal which may indicate the position of the target, secondly the selection of the feature considered most likely to represent the target, and thirdly calculation of the actual position of the target relative to the profile of the selected feature. Typically an echo return signal will consist of background which, in the early stages of the return signal is mainly due to ringing of the transducer following a transmit pulse, and then reverberation from target area and noise. Typical systems process this response sequentially according to time lapse from transmission of the pulse looking for peaks in the response projecting above the background or a time varying threshold simulating or replacing the background. A difficulty with this approach is illustrated by the example given above, when the target of interest does not necessarily produce a marked peak, although it does produce a discontinuity in the echo response.

SUMMARY OF THE INVENTION

According to the invention, a method of measuring the position of a target feature in a pulse-echo measuring system comprises transmitting at least one pulse of high frequency energy from a transducer towards the target feature, receiving energy reflected back from the direction of the target feature to the transducer to provide a return signal or signals, repeatedly sampling the amplitude of the return signal or signals at intervals to form a digital database relating signal amplitude to elapsed time, and searching the database for at least one target zone in which a greater than background rate of fall of the return signal amplitude is sustained.

In sludge monitoring and similar applications, the measurement of interest is the distance of an interface between a sludge layer and a supernatant layer above the bottom of a tank, vessel or channel. This can be located by searching the digital database for that target zone nearest above the immediate vicinity of the bottom of the tank, vessel or channel.

In most conventional applications, it is preferred to locate the leading edge of echoes, whereas the method of the present invention will locate the trailing edges. In most circumstances, the leading edge of reflective features can be located more accurately, since typical energy pulses exhibit a rapid initial attack and a much slower decay. This can cease to be the case when the target represents an interface between layers of different absorption characteristics, while trailing edge detection even of highly reflective targets may provide a means of detecting echoes whose leading edges might otherwise be masked, for example by another echo shortly in advance of the wanted echo from the target feature.

Further features of the invention will be apparent from the following descriptions of an exemplary embodiment of the invention with reference to the accompanying drawings.

SHORT DESCRIPTION OF THE DRAWINGS

FIG. 1 is a simplified schematic diagram of a pulse echo ranging system;

FIG. 2 is a section through a settling tank illustrating an exemplary operational environment for the mechanism;

FIG. 3 is a graph illustrating an exemplary echo profile produced by a signal component at one of the frequencies utilized;

DESCRIPTION OF THE PREFERRED EMBODIMENT

Referring to FIG. 2, there is shown a simplified schematic diagram of a pulse echo ranging system controlled by a central processing unit (CPU) 2. Typically the CPU 2 will be incorporated in a microcontroller implementing peripheral functions used to implement some of the other blocks shown in FIG. 1 as well as additional functions not described. The CPU operates under a control program stored in read-only memory (ROM) 4, utilizing parameters stored in non-volatile random access memory (NOVRAM) 6, and provided with working memory in the form of random access memory (RAM) 8. An interface 10 provides for the export of data from the unit, and the import of operating parameters. Data may be exported in the form of a display, telemetry signals or alarm signals. The CPU 2 also controls a transmitter 12 which controls the timing, frequency and amplitude of high frequency pulses applied to a transducer 14. A receiver 16 receives return echo signals from the same or a different transducer, amplifies them, usually logarithmically, and applies them to an analog to digital converter 18, from where the digital echo profile is stored in RAM 8 for further processing.

The operation of such systems is described in more detail in our U.S. Pat. Nos. 4,596,144; 4,831,565; 4,890,266; 4,999,998 and 5,076,751, and only features of difference will be discussed further below.

Referring to FIG. 2, this shows an exemplary application of the invention, used for monitoring a sludge interface 20 in a tank 22, in which the transducer 14 is mounted with at least its radiating face 24 submerged in the liquid content of the tank. Above the interface 20, the liquid content is liquid containing suspended material and possibly gas bubbles, while a denser sludge phase 28 settles out beneath the interface and above the bottom wall 30 of the tank.

FIG. 3 illustrates an exemplary echo response to a high frequency acoustic pulse emitted by the transducer 14 into the tank 22. In this instance there is a strong echo 32 from the bottom of the tank, while the weaker true echo 34 from the interface 20 shows little increase in amplitude relative to the immediately preceding portion of the profile which consists not only of a component due to ringing of the transducer, but also energy reflected by the suspended material in the liquid above the interface. This reflected energy tends to mask the wanted echo.

The response of FIG. 3 represents a plot of a digital database formed by a sample of the return signal from the receiver. It may be constructed from the response from a single pulse, or multiple pulses either at the same frequency or at multiple frequencies, as disclosed in our prior patents referenced above and in our copending application filed the same day as this application and entitled "Acoustic Pulse Echo Ranging System". In an exemplary embodiment, the database is processed to locate a target feature by the microprocessor 2, using a control program including routines as set forth in the following source code, written in the C++ language.

```
/*++>>m1*/                                            /* Puts comment block into Library docume
unit last_echo_alg(struct echo_template *echosp,   /* pointer to echo structure *
                   byte *conf_p)                   /* pointer to echo confidence *
/*----------------------------------------------------------------------------------------------
Description:   Select last peak in array echosp->echo[ ] which:
                   1. has confidence >= CONF_THRESH_LONG
                   2. is between echosp->near_blanking and EMPTY_DISTANCE
               If confidence threshold cannot be met then select peak with
               highest conf.
Parameters:    echosp members used include
                   echosp->point
                   echosp->echo
                   echosp->near_blanking
                   echosp->long_echo_range
Return:        index      =    Echo peak position in STANDARD SAMPLES.
                                echosp->echo[index] = peak value of echo (strength).
               *conf_p    =    Echo confidence = 0.5 X echo falling edge in dB
               If there is no echo at all then return index = *conf_p = 0
Portability       <portable - list O/S, H/W dependencies>
Resources         <any resources (time delays, h/w etc.) the function requires>
Dependiences      <any functions/data that must be setup before calling>
Warnings
Usage             <How to use if required>
Example           <or an example if required>
Keywords          <keywords that could be used in an search to find function>
Created by:       Steven Woodward 07-Sep-98
Revised by:
----------------------------------------------------------------------------------------------*/
/*++>>m1*/                                            /* end of library header */
{
byte    thresh, conf=0;
byte    *echo, *start_p, *end_p;
int     point;
uint    range, empty, index=0;
float   empty_distance;
        point     =   echosp->point;                  /* transducer number */
        echo      =   echosp->echo;                   /* pointer to echo profile */
        start_p   =   echo + echosp->near_blanking;
/*      Set end_p to last byte in echo[ ] as defined by EMPTY_DISTANCE.
        Note: if EMPTY_DISTANCE was very large or if echo profile was downloaded from PC
        then end_p could go beyond echosp->long_echo_range which is bad, so we check. */
        range = echosp->long_echo_range;    /* number of valid bytes in arrays */
        empty_distance = recall_float(point, 0, EMPTY_DISTANCE);
        empty = meters_tblvel_to_std_samples(empty_distance, point);
        if  (range < empty)
            empty = range;
```

-continued

```
        end_p = echo + empty - 1;              /* pointer to last byte in echo[ ] */
        thresh = (byte)recall_int(point, 0, CONF_THRESH_LONG);
        if (start_p < end_p)          /* too much blanking ? */
            for (conf=0; (conf == 0) && thresh>0; thresh--)
                index = last_echo(echo, start_p, end_p, thresh, &conf);
        *conf_p = conf;        /* results */
        return(index);
}       /* end of function */
/*---------------------------------PEAK_REVERSE------------------------------------------*/
byte peak_reverse(byte **pnter,      /* pointer to: pointer to start search */
                  byte *stop_p,      /* pointer to last byte to search      */
                  byte ripple)       /* ripple rejection in dB              */
/* Locate a echo peak by reverse search
        return:    byte        = peak value
                   byte **pnter = points to peak
*/
{
byte peak, limit, *echo_p;
    echo_p = *pnter;                 /* begin search from *pnter */
    peak = *echo_p;
    while (echo_p > stop_p) {
                                     /* local peak */
        while ( (*echo_p <= echo_p[-1]) && (echo_p > stop_p) )
            echo_p--;
        if (*echo_p < peak)          /* stop if new peak < old */
            break;
        peak = *echo_p;
        *pnter = echo_p;
        limit = (byte) (peak - ripple);      /* local valley */
        while ( (*echo_p>=echo_p[-1]) && (echo_p > stop_p) && (*echo_p>limit) )
            echo_p--;
        if (*echo_p <= limit)        /* stop if ripple exceeded */
            break;
        }
    return (peak);
}
/*-------------------------------VALLEY REVERSE----------------------------------------*/
byte valley_reverse(byte **pnter,    /* pointer to: pointer to start search */
                    byte *stop_p,    /* pointer to last byte to search      */
                    byte ripple)     /* ripple rejection in dB              */
/* Locate echo valley by reverse search.
        return:    byte         = valley value
                   byte **pnter = points to valley
*/
{
byte valley, limit, *echo_p;
    echo_p = *pnter;                 /* begin search from *pnter */
    valley = *echo_p;
    while (echo_p > stop_p) {
                                     /* local valley */
        while ( (*echo_p >= echo_p[-1]) && (echo_p > stop_p) )
            echo_p--;
        if (echo_p > valley)         /* stop if new valley > old */
            break;
        valley = *echo_p;
        *pnter = echo_p;
        limit = (byte)(valley + ripple);     /* local peak */
        while ( (*echo_p<=echo_p[-1]) && (echo_p > stop_p) && **echo_p<limit) )
            echo_p--;
        if (*echo_p >= limit)        /* stop if ripple exceeded */
            break;
        }
    return (valley);
}
/*----------------------------------LAST_ECHO-------------------------------------------*/
uint last_echo(byte echo[ ],         /* echo profile */
               byte *start_p,        /* pointer to start search */
               byte *end_p,          /* pointer to last sample to search */
               byte thresh,          /* minimum echo confidence */
               byte *conf_p)         /* pointer to echo confidence */
/* Subrountint called by last_echo_algorithm( )
    Select, by reverse search, last peak in array echo[ ] which:
        1. has confidence >= thresh
        2. is between start_p and end_p (search begins at end_p)
        return:   index      =   Echo peak position in STANDARD SAMPLES.
                                 echo[index] = peak value of echo (strength).
                  *conf_p    =   Echo confidence = 0.5 x echo falling edge in dB
                                 If no echo found then returns: index = *conf_p = 0
*/
```

-continued

```
{
byte    valley, peak, conf;
uint    index;
        conf = 0;
        while ( (end_p > start_p) && (conf < thresh) ) {
            valley = valley_reverse(&end_p, start_p, (byte)(thresh*2));   /* valley */
            peak = peak_reverse(&end_p, start_p, STD_REJ);                /* peak */
            conf = (byte) ((peak - valley) / 2);                          /* confidence */
        }
    if  (conf < thresh) {                                                 /* check */
            index = 0;
            conf = 0;
        }
    else
            index = end_p - echo;
        *conf_p = conf;                                                    /* results */
        return(index);
}
```

It will be seen that the above routines search the array "echo[ ]", i.e. the digital database, for the last "peak" in the response before an end point "end_p" which is set at a range equivalent to a level just above the bottom of the tank, typically by an amount just enough to allow for deposits that may adhere to the bottom of the tank and raise its effective level. The start point "start_p" is set to exclude an initial portion of the echo response above the highest level at which an interface can be expected. The routines check that the end point is within the tank, and then search for peaks in the response, moving back through the database, that exceed associated valleys by more than a given threshold. More specifically, the routines identify valleys and peaks in the profile, and the difference in amplitude in decibels between a valley and an immediately preceding peak. Half of this difference in amplitude is taken to represent a confidence factor "conf". A peak is taken to represent a wanted echo if its associated confidence factor exceeds a threshold "thresh", failing which the peak associated with the largest confidence factor is selected. It will be appreciated that the rate of decline of amplitude between peak and valley must be greater than the rate of decline of the response in the absence of response from a target. The routines are written to achieve this by requiring a minimum decline from sample to sample, subject to filtering of ripple in the response.

Variations are possible in the above routines. As set forth, it identifies only a single peak in the response. The program could of course be altered to detect multiple peaks, either representing multiple targets, or a peak representing a wanted target could be selected using an alternative algorithm.

The routines could be included in conventional pulse echo ranging systems as an alternative means to detect echoes where other routines fail, or to increase confidence that a correct echo has been identified by other techniques.

The routines shown require the user to set the physical distance from the transducer to the tank bottom. An incorrect setting could cause the routines to fail by including in the portion of the database searched the response from the tank bottom. The routines could be used in a preliminary step to locate the tank bottom, from which an echo will usually be present, in order to check or adjust the user setting. Furthermore, detection of the tank bottom in this way enables range data calculated by the system from the tank bottom response to be checked against a known physical distance to the tank bottom. Any difference permits a correction factor to be calculated and applied to allow for effects on sound velocity due to temperature and material density, thus dispensing with the need for any separate sensing of these parameters.

While the invention has been described with reference to an acoustic pulse-ranging system, the principles of the invention are in general equally applicable to systems using other forms of pulse energy such as microwave energy.

Although the routines outlined above locate a peak preceding a valley, the position of the peak does not necessarily represent the exact location of the target producing the peak, and further processing of the echo profile may be necessary to calculate the exact position of the target relative to the peak. For example, the exact position may be deemed to coincide with, or have a predetermined offset relative to, the rising edge of the echo, the falling edge of the echo, the peak of the echo, or the centre of mass of the echo. In some applications, one method may be preferred to another depending on the shape of the response. A user may prefer one technique over another because of the nature of any slight bias it applies to the position obtained.

We claim:

1. A method of measuring the position of a target feature in a pulse-echo ranging system comprises transmitting at least one pulse of high frequency energy from a transducer towards the target feature, receiving energy reflected back from the direction of the target feature to the transducer to provide a return signal or signals, repeatedly sampling the amplitude of the return signal or signals at intervals to form a digital database relating signal amplitude to elapsed time, and searching the database for at least one target zone in which a greater than background rate of fall of the return signal amplitude is sustained.

2. A method according to claim 1, comprising searching the database for a least one peak preceding a valley and having an amplitude exceeding that of the valley by more than predetermined threshold.

3. A method according to claim 1, wherein the threshold is set in decibels.

4. A method according to claim 2, wherein the database is searched for that peak short of but nearest a range corresponding to a bottom of a tank, vessel or channel in which the method is operated.

5. A method according to claim 4, wherein energy of the pulses is acoustic energy, the database is also searched for a peak corresponding to the bottom of the tank, vessel or channel, a calculated distance to the peak is compared with a known distance to the bottom of the tank, and any difference is used to calculate a correction to compensate for variations in the speed of sound within the tank.

6. A pulse-echo measuring system for measuring the position of a target feature, said pulse-echo measuring system comprising:

a transmitter for transmitting at least one pulse of high frequency energy from a transducer towards the target feature;

a receiver for receiving energy back from the direction of the target feature to the transducer to provide a return signal;

a controller for repeatedly sampling the amplitude of the return signal at intervals to form a digital database relating signal amplitude to elapsed time, and said controller searching the digital database for at least one target zone in which a greater than background rate of fall of the return signal amplitude is sustained.

7. The pulse-echo measuring system as claimed in claim 6, wherein said controller comprises a suitably programmed microcontroller.

* * * * *